(12) United States Patent
Shinoi et al.

(10) Patent No.: US 7,672,366 B2
(45) Date of Patent: Mar. 2, 2010

(54) LINE QUALITY REPORT ACCURACY MEASUREMENT DEVICE AND ACCURACY MEASUREMENT METHOD

(75) Inventors: Kenichiro Shinoi, Yokohama (JP); Hidetoshi Suzuki, Yokosuka (JP)

(73) Assignee: Panasonic Corporation, Osaka (JP)

( * ) Notice: Subject to any disclaimer, the term of this patent is extended or adjusted under 35 U.S.C. 154(b) by 860 days.

(21) Appl. No.: 10/542,611

(22) PCT Filed: Dec. 12, 2003

(86) PCT No.: PCT/JP03/15944
§ 371 (c)(1), (2), (4) Date: Jul. 18, 2005

(87) PCT Pub. No.: WO2004/066547
PCT Pub. Date: Aug. 5, 2004

(65) Prior Publication Data
US 2006/0056501 A1 Mar. 16, 2006

(30) Foreign Application Priority Data
Jan. 24, 2003 (JP) ............................. 2003-016385

(51) Int. Cl.
*H04B 17/00* (2006.01)
(52) U.S. Cl. ...................... 375/225; 375/224
(58) Field of Classification Search ............... 375/224, 375/225
See application file for complete search history.

(56) References Cited
U.S. PATENT DOCUMENTS
6,215,827 B1 4/2001 Balachandran et al.
(Continued)

FOREIGN PATENT DOCUMENTS
EP 0797327 9/1997
(Continued)

OTHER PUBLICATIONS
Panasonic, R4-021453 "Simulation Results of Variable Reference Channel", RAN WG4 meeting #25, Secaucus, NJ, USA, Nov. 2002.*
(Continued)

*Primary Examiner*—David C Payne
*Assistant Examiner*—Nader Bolourchi
(74) *Attorney, Agent, or Firm*—Dickinson Wright PLLC

(57) ABSTRACT

A channel quality report accuracy measurement apparatus and accuracy measurement method are provided that correctly measure the accuracy of channel quality reported from a communication apparatus. A scheme control section (140) stores coding rates and modulation schemes corresponding to CQIs, and specifies the transmission scheme corresponding to a fixed CQI reported from a CQI statistical processing section (230). A CQI decoding section (220) decodes a reported CQI contained in a received signal. The CQI statistical processing section (230) performs statistical processing of reported CQIs corresponding to test data transmitted prior to an accuracy measurement test, and reports the most frequently reported CQI to the scheme control section (140) as a fixed CQI. A PER calculation section (260) calculates the PER in the communication apparatus from the reported CQI and Ack/Nack corresponding to test data transmitted in accordance with the fixed CQI. A determination section (270) performs threshold value determination for the PER for each reported CQI value, and outputs the reported CQI scheme determination result.

9 Claims, 4 Drawing Sheets

U.S. PATENT DOCUMENTS

| | | | |
|---|---|---|---|
| 6,760,882 B1 * | 7/2004 | Gesbert et al. | 714/774 |
| 2002/0010001 A1 * | 1/2002 | Dahlman et al. | 455/522 |
| 2003/0012195 A1 | 1/2003 | Ohkubo et al. | |

FOREIGN PATENT DOCUMENTS

| | | |
|---|---|---|
| EP | 0944201 A2 * | 9/1999 |
| JP | 11313040 | 11/1999 |
| JP | 2001268148 | 9/2001 |
| KR | 20020029333 | 4/2002 |
| WO | WO 01/78324 A1 * | 10/2001 |
| WO | 0225853 | 3/2002 |

OTHER PUBLICATIONS

Sony, R4-021591 "Simulation results for HSDPA variable reference channels", RAN WG4 meeting #25, Secaucus, NJ, USA, Nov. 2002.*

Qualcomm, R4-021532 "VRC Simulation Results", RAN WG4 meeting #25, Secaucus, NJ, USA, Nov. 2002.*

3GPP, R4-021360, "LS on the definition of CQI", RAN WG4 meeting #24, Helsinki, Finland, Aug. 2002.*

3GPP, R4-021603, "Response to LS on the definition of CQI", RAN WG4 meeting #25, Secaucus, NJ, USA, Nov. 2002.*

Ericsson, R4-021453 "Simulation results for HSDPA (Variable Reference Channel)", RAN WG4 meeting #25, Secaucus, NJ, USA, Nov. 2002.*

Motorola, R4-021535 "Further Results for HSDPA Variable Reference Channels", RAN WG4 meeting #25, Secaucus, NJ, USA, Nov. 2002.*

Panasonic, R4-021578 "Simulation Results of Variable Reference Channel", RAN WG4 meeting #25, Secaucus, NJ, USA, Nov. 2002.*

3GPP, Draft TR 25.890v1.2.0, R4-021538 "HSDPA, UE Radio Transmission and Reception", RAN WG4 meeting #25, Secaucus, NJ, USA, Nov. 2002.*

Supplementary European Search Report dated Apr. 12, 2007.

Korean Office Action dated Sep. 25, 2006 with English translation.

PCT International Search Report dated Feb. 3, 2004.

"VRC Test Approach," TSG-RAN Working Group 4 (Radio) meeting #25, Secaucus, New Jersey, USA, Nov. 11-15, 2002, R4-021533, 1 page front & back.

"Augmentative VRC Test Proposal," TSG-RAN Working Group 4 (Radio), HSDPA Ad-Hoc, Qualcomm, 9 pages total, Jan. 14, 2003.

* cited by examiner

LINE QUALITY REPORT ACCURACY MEASUREMENT DEVICE AND ACCURACY MEASUREMENT METHOD

This application is a 35 USC 571 application based on PCT international application PCT/JP2003/015944 filed Dec. 12, 2003, and claims the benefit of priority of Japanese patent application JP2003-016385 filed Jan. 24, 2003, the contents of which are incorporated herein by reference.

TECHNICAL FIELD

The present invention relates to an accuracy measurement apparatus and accuracy measurement method for channel quality report.

BACKGROUND ART

Recently, in the radio communication field, high-speed packet communications such as HSDPA (High Speed Downlink Packet Access) have been attracting attention. In HSDPA, packets are transmitted at the optimal transmission rate according to the downlink propagation environment, and therefore an adaptive modulation scheme is used for packet transmission from a base station apparatus.

In a radio communication system in which an adaptive modulation scheme is used, a mobile station apparatus obtains a CQI (Channel Quality Indicator), which is indicative of propagation environment, from the reception quality of a receive packet, and reports this CQI to the base station apparatus that transmitted the packet. Then, in order to transmit packets at the optimal transmission rate according to the reported CQI, the base station apparatus selects a transmission scheme that will achieve that transmission rate. A transmission scheme that will achieve that transmission rate is decided upon based on the coding rate, number of codes multiplexed, modulation scheme and so forth, for example. By this means, a desired PER (Packet Error Rate), neither excessive nor inadequate, can be achieved by a mobile station apparatus.

Since a base station apparatus selects an optimal transmission rate according to the reported CQI in that way, using an adaptive modulation scheme is based on the important premise of accurately reported CQIs. Consequently, methods of testing the accuracy of a reported CQI have heretofore been proposed.

For example, 3GPP, R4-021533 "VRC Test Approach", TSG-RAN Working Group 4 (Radio) meeting #25 Secaucus, N.J., USA, 11th-15th Nov. 2002 described a method whereby packets are continuously transmitted for a fixed period using a modulation scheme, coding rate, and transport block size corresponding to a fixed CQI, and the PER and throughput in that case are measured.

Specifically, packets are transmitted for a fixed period to a communication apparatus under test such as a mobile station apparatus, with a transmission rate (that is, a modulation scheme, coding rate, and transport block size) corresponding to a fixed CQI, without regard to the reported CQI from that communication apparatus. During this period, the communication apparatus performs CQI reporting and also reports Ack/Nack indicating whether or not a transmitted packet has been received correctly. Then, using the reported CQI and Ack/Nack for the same packet, the PER is calculated for each reported CQI value, and results such as those shown in FIG. 1 are obtained.

In FIG. 1, when the CQI is fixed at 10, for example, (the middle graph in the figure), if the reported CQI, which should be 10, is less than 10, this indicates that the propagation environment is poor—in other words, that the communication apparatus cannot correctly receive a packet transmitted at a transmission rate corresponding to the CQI of 10. Therefore, when the reported CQI is less than 10, the PER is higher.

On the other hand, if the reported CQI is 10 or above, this indicates that the propagation environment is good—in other words, that the communication apparatus can correctly receive a packet transmitted at a transmission rate corresponding to the CQI of 10. Therefore, when the reported CQI is 10 or above, the PER is low.

By using such test results, it is possible to decide upon criteria such as the PER upper limit and throughput lower limit for each reported CQI value, and to determine whether or not the criteria are met for each reported CQI.

However, a problem with a method whereby packets are continuously transmitted for a fixed period at a transmission rate corresponding to a fixed CQI and reported CQI accuracy is measured, as described above, is that the CQI is not fixed at a value that is optimal for all communication apparatuses. That is to say, a communication apparatus incorporating advanced receivers such as an equalizer and interference canceler, for example, has reception performance higher than a communication apparatus that does not have such advanced receivers, and therefore the propagation environment is determined to be better than it actually is, and a CQI higher than the fixed CQI is reported frequently as the reported CQI, which consequently results in invalidity of such a reported CQI accuracy measurement test.

Also, if a communication apparatus tends to report a CQI lower than is actually the case as a reported CQI, the PERs for reported CQI values will become lower on the whole. There is thus a problem of PERs corresponding to reported CQI values easily falling below the respective decided PER upper limits, resulting in erroneous passing of the test. If such a communication apparatus that lowers a reported CQI is present in a radio communication system, packets will be transmitted at a low transmission rate overall, and overall system throughput will fall.

DISCLOSURE OF INVENTION

It is an object of the present invention to correctly measure the accuracy of channel quality reported from a communication apparatus.

The idea of the present invention is to conduct an accuracy measurement test of a CQI (Channel Quality Indicator), which is indicative of propagation environment, by transmitting test data for a fixed period prior to the CQI accuracy measurement test, taking a CQI reported frequently among reported CQIs from the communication apparatus under test within that period as a fixed CQI, and transmitting accuracy measurement data for a fixed period at a transmission rate corresponding to the fixed CQI.

According to one aspect of the present invention, an accuracy measurement apparatus measures the accuracy of a channel quality report value generated by a communication apparatus, and employs a configuration having a transmitting section that transmits a predetermined signal to the communication apparatus for a fixed period; a decision section that decides upon channel quality corresponding to one report value among report values generated by the communication apparatus for a transmitted predetermined signal as a fixed channel quality; a calculation section that calculates the error rate of an accuracy measurement signal transmitted at a transmission rate in accordance with the decided fixed channel quality, the error rate being corresponding to a report value generated by the communication apparatus for this accuracy measurement signal; and a determination section that determines the accuracy of a report value generated by the communication apparatus for the accuracy measurement signal using the calculated error rate.

According to another aspect of the present invention, an accuracy measurement method measures the accuracy of a channel quality report value generated by a communication apparatus, and has a step of transmitting a predetermined signal to the communication apparatus for a fixed period; a step of deciding upon channel quality corresponding to one report value among report values generated by the communication apparatus for a transmitted predetermined signal as a fixed channel quality; a step of transmitting an accuracy measurement signal to the communication apparatus at a transmission rate corresponding to the decided fixed channel quality; a step of calculating the error rate for the transmitted accuracy measurement signal, the error rate being corresponding to a report value generated by the communication apparatus for this accuracy measurement signal; and a step of determining the accuracy of a report value generated by the communication apparatus for the accuracy measurement signal using the calculated error rate.

BEST MODE FOR CARRYING OUT THE INVENTION

With reference now to the accompanying drawings, an embodiment of the present invention will be explained in detail below.

Figure 1:
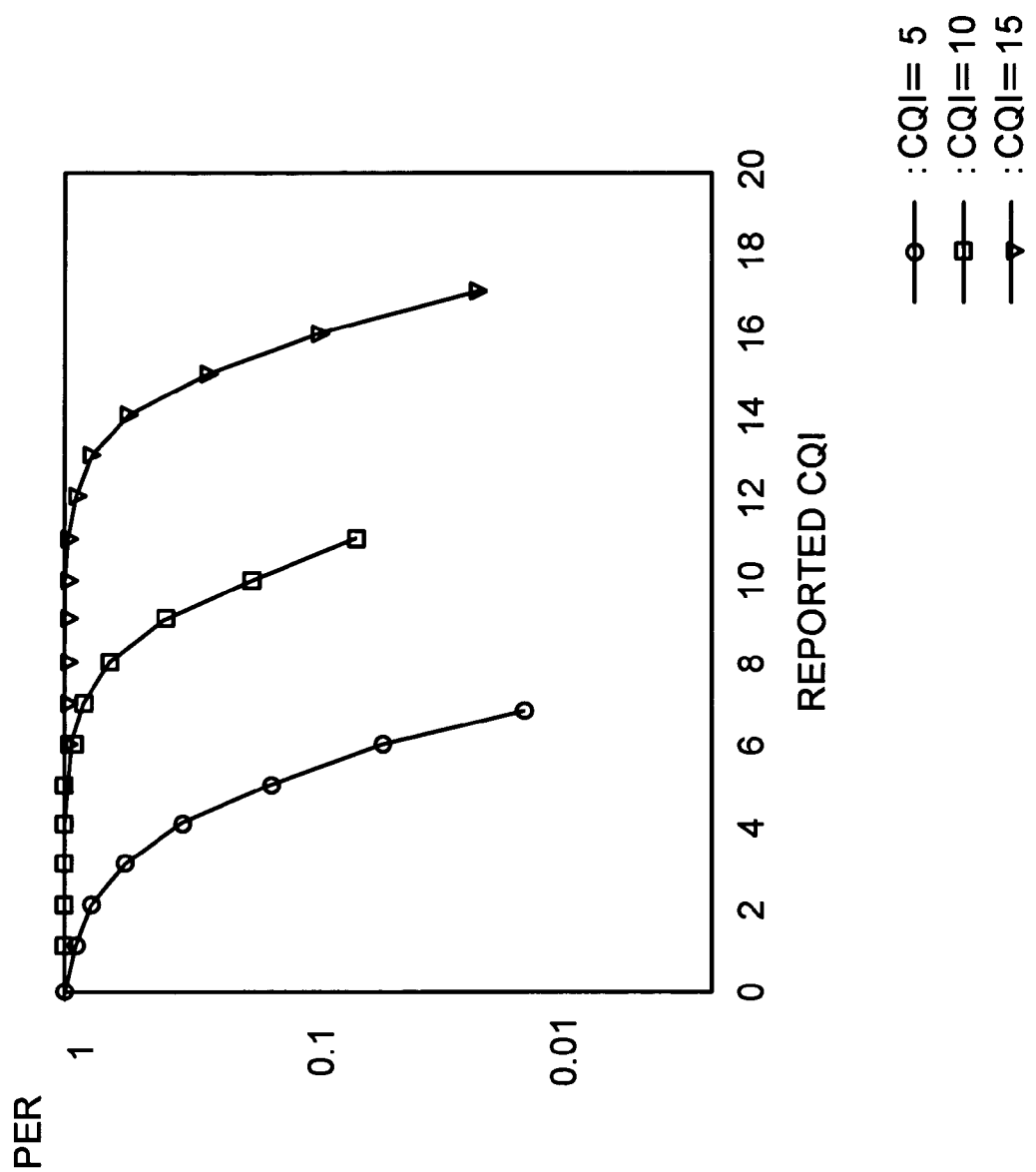
FIG. 1 is a graph showing an example of results of a conventional accuracy measurement test.
Figure 2:
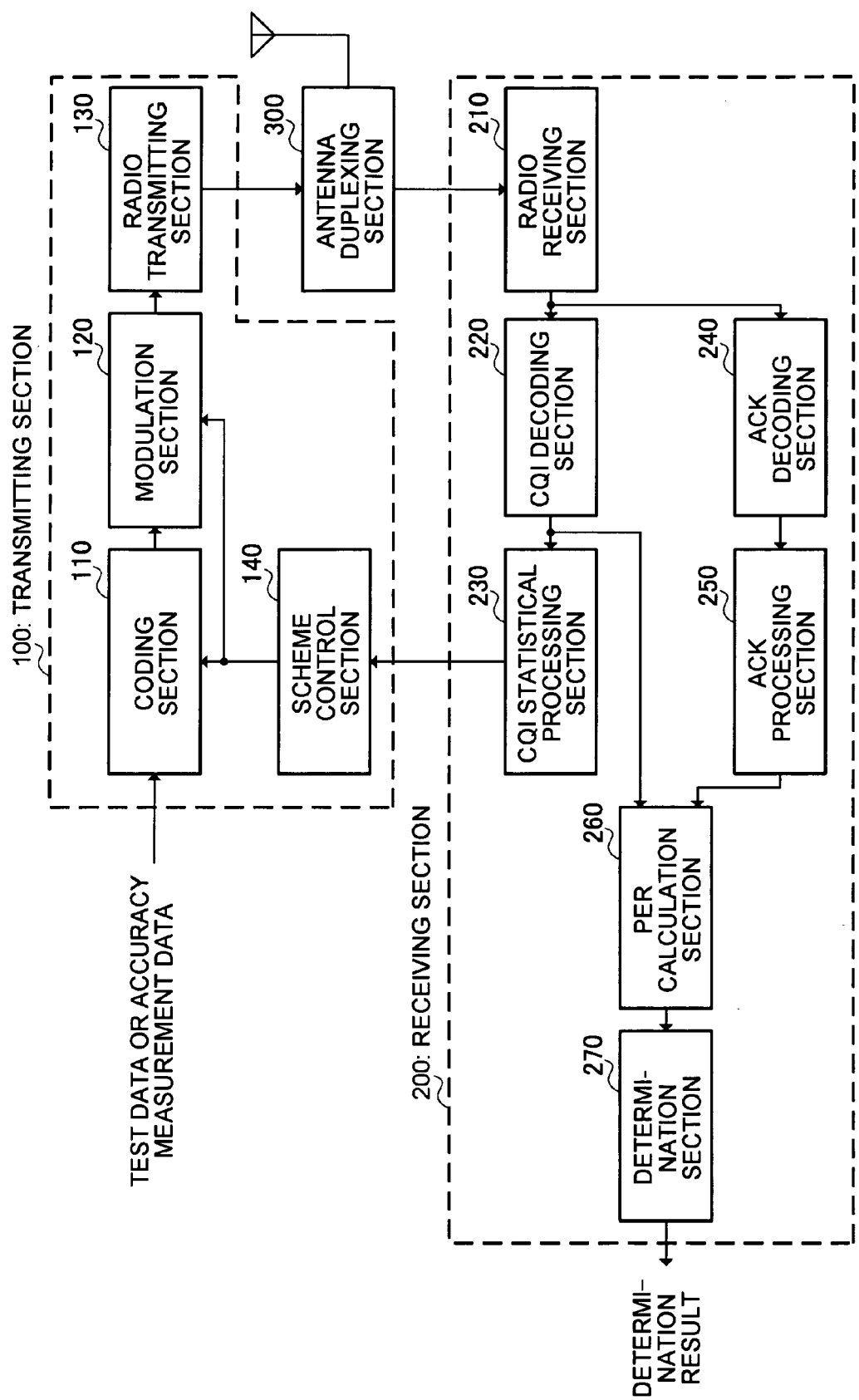
FIG. 2 is a block diagram showing the configuration of an accuracy measurement apparatus according to an embodiment of the present invention.

FIG. 2 is a block diagram showing the configuration of an accuracy measurement apparatus according to an embodiment of the present invention. The accuracy measurement apparatus shown in FIG. 2 is mainly composed of a transmitting section 100 that transmits test data and accuracy measurement data, a receiving section 200 that receives Ack/Nack indicating whether or not a transmit signal has been received correctly and a reported CQI from the communication apparatus under test, and an antenna duplexing section 300 that shares an antenna between transmitting section 100 and receiving section 200.

Transmitting section 100 has a coding section 110, a modulation section 120, a radio transmitting section 130, and a scheme control section 140. Receiving section 200 has a radio receiving section 210, a CQI decoding section 220, a CQI statistical processing section 230, an Ack decoding section 240, an Ack processing section 250, a PER (Packet Error Rate) calculation section 260, and a determination section 270.

Coding section 110 codes test data and accuracy measurement data using a coding rate specified by scheme control section 140.

Modulation section 120 modulates test data and accuracy measurement data using a modulation scheme specified by scheme control section 140.

Radio transmitting section 130 executes predetermined radio transmission processing (such as D/A conversion and up-conversion) on coded and modulated test data and accuracy measurement data, and transmits the processed data via antenna duplexing section 300 and the antenna.

Scheme control section 140 stores coding rates and modulation schemes corresponding to CQI values, and specifies to coding section 110 and modulation section 120 respectively the coding rate and modulation scheme corresponding to a fixed CQI reported from CQI statistical processing section 230. Scheme control section 140 also specifies a predetermined coding rate and modulation scheme to coding section 110 and modulation section 120 respectively prior to a reported CQI accuracy measurement test.

Radio receiving section 210 executes predetermined radio reception processing (such as down-conversion and A/D conversion) on a signal received via the antenna and antenna duplexing section 300.

CQI decoding section 220 decodes a reported CQI contained in the received signal, and outputs the decoding result to CQI statistical processing section 230 and PER calculation section 260.

CQI statistical processing section 230 performs statistical processing of reported CQIs corresponding to test data transmitted prior to a reported CQI accuracy measurement test, and reports the most frequently reported CQI to scheme control section 140 as a fixed CQI.

Ack decoding section 240 decodes Ack/Nack contained in the received signal, and outputs the decoding result to Ack processing section 250.

Ack processing section 250 determines from the Ack/Nack decoding result whether or not accuracy measurement data transmitted during a reported CQI accuracy measurement test has been received correctly by the communication apparatus, and reports the determination result to PER calculation section 260.

PER calculation section 260 calculates the PER in the communication apparatus for each reported CQI value from the reported CQI and Ack/Nack corresponding to accuracy measurement data transmitted during the reported CQI accuracy measurement test.

Determination section 270 performs threshold value determination for the PER for each reported CQI value calculated by PER calculation section 260, and outputs the reported CQI accuracy determination result.

Figure 3:
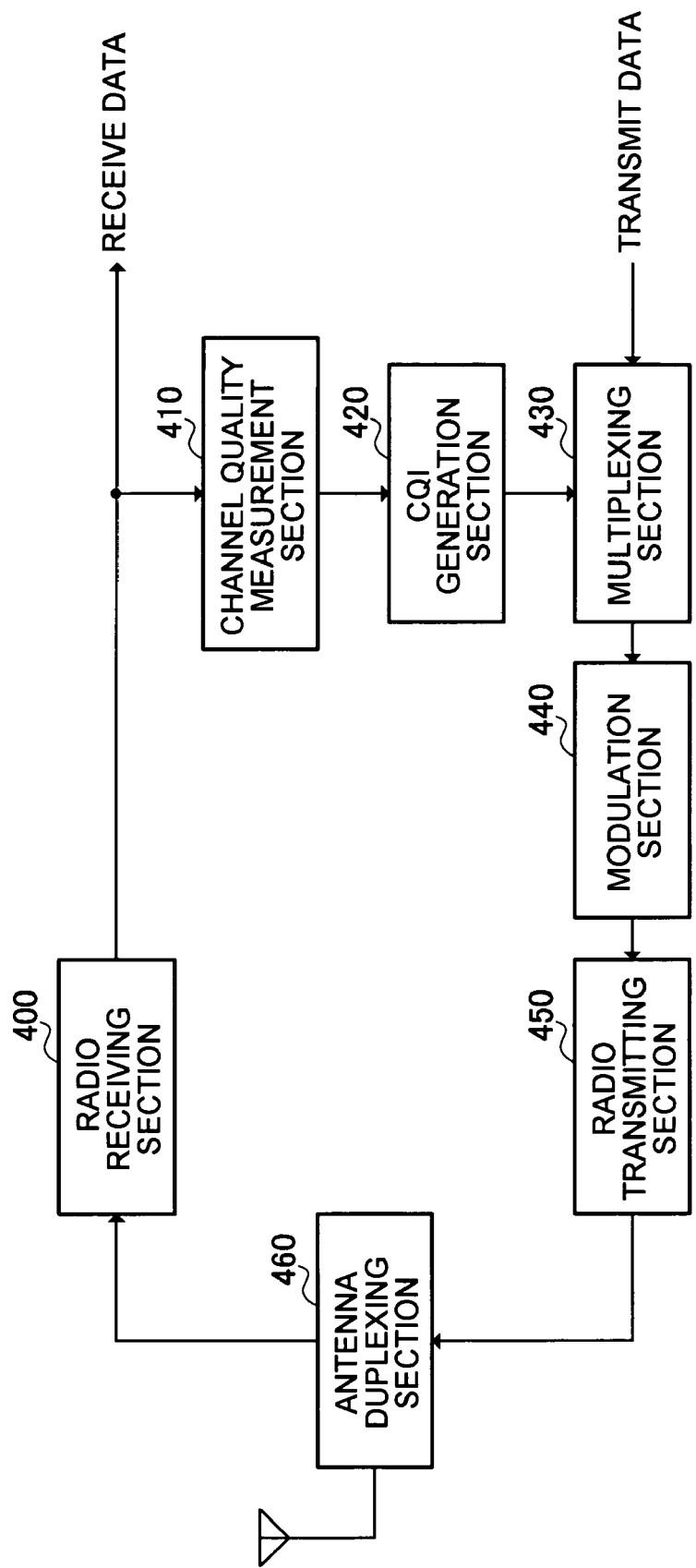
FIG. 3 is a block diagram showing the configuration of a communication apparatus according to an embodiment.

FIG. 3 is a block diagram showing the main configuration of a communication apparatus subject to testing by an accuracy measurement apparatus according to an embodiment. The communication apparatus shown in FIG. 3 is mainly composed of a radio receiving section 400 that executes predetermined radio reception processing (such as down-conversion and A/D conversion) on a received signal, a channel quality measurement section 410 that measures channel quality from a received signal, a CQI generation section 420 that generates a reported CQI for reporting measured channel quality, a multiplexing section 430 that multiplexes transmit data and reported CQIs, a modulation section that modulates multiplexed data, a radio transmitting section 450 that executes predetermined radio transmission processing (such as D/A conversion and up-conversion) on modulated data, and an antenna duplexing section 460 for sharing an antenna between radio receiving section 400 and radio transmitting section 450.

Figure 4:
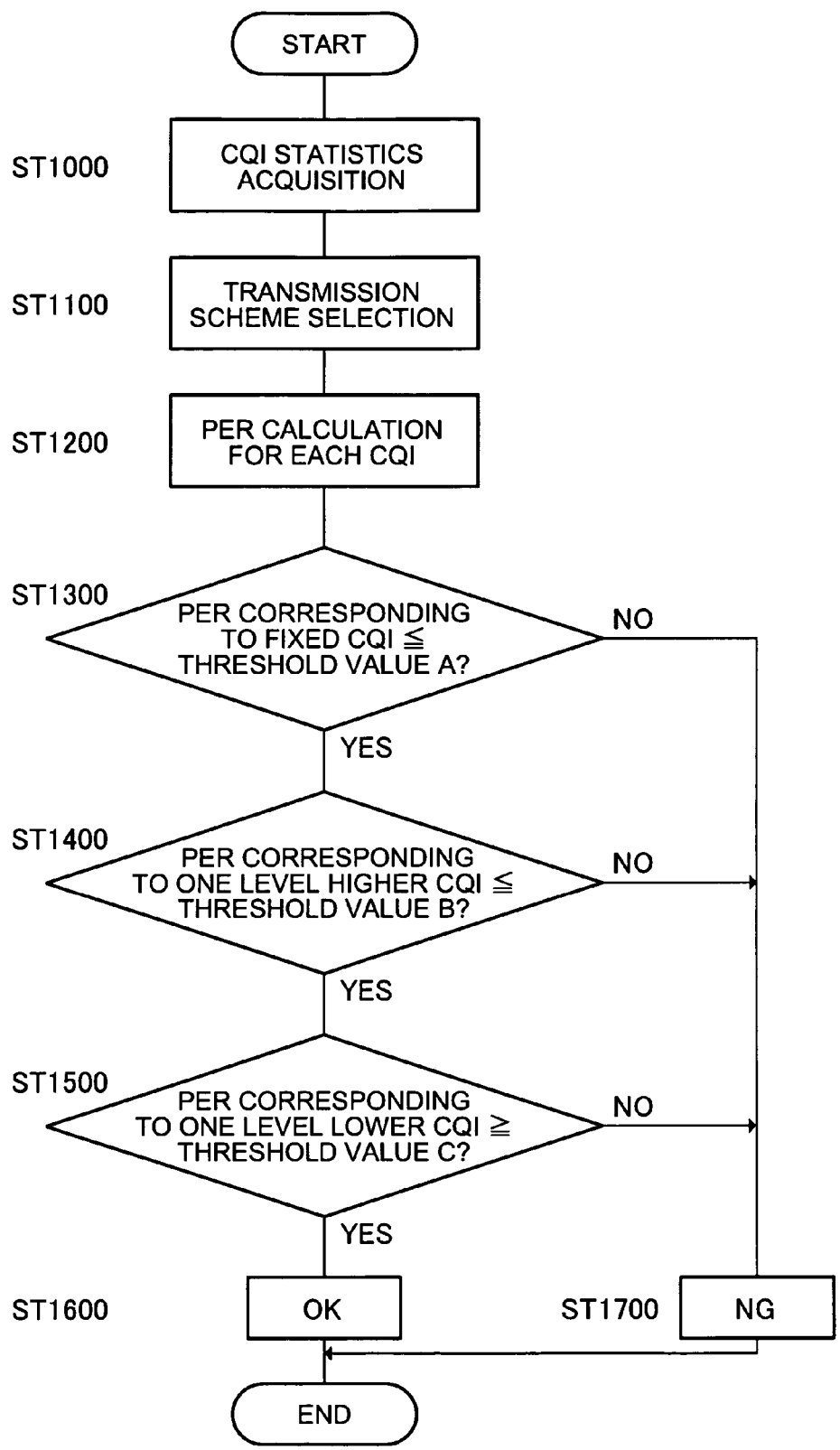
FIG. 4 is a flowchart showing the operation of an accuracy measurement apparatus according to an embodiment.

Next, the operation of an accuracy measurement apparatus configured as described above will be explained with reference to the flowchart shown in FIG. 4.

First, prior to a reported CQI accuracy measurement test, test data is coded by coding section 110 and modulated by modulation section 120, undergoes predetermined radio transmission processing by radio transmitting section 130, and is then transmitted for a fixed period via antenna duplexing section 300 and the antenna. At this time, scheme control section 140 specifies a predetermined coding rate and modulation scheme to coding section 110 and modulation section 120 respectively, and coding section 110 and modulation section 120 perform coding and modulation respectively using the specified coding rate and modulation scheme. At this time, also, various kinds of reported CQI are reported from the communication apparatus shown in FIG. 3 by using a predetermined channel model in which the propagation environment varies non-periodically.

Transmitted test data is received by radio receiving section 400 via the antenna and antenna duplexing section 460 of the communication apparatus shown in FIG. 3, channel quality is measured by channel quality measurement section 410, and a reported CQI is obtained by CQI generation section 420. Then transmit data and the reported CQI are multiplexed by multiplexing section 430, modulated by a modulation section 440, and transmitted to the accuracy measurement apparatus shown in FIG. 2 from radio transmitting section 450 via antenna duplexing section 460 and the antenna. This reported CQI transmission is performed at predetermined intervals, and a plurality of reported CQIs are assumed to be transmitted in the period in which the accuracy measurement apparatus shown in FIG. 2 transmits test data prior to a reported CQI accuracy measurement test. Also, since test data transmission is performed using a predetermined channel model in which the propagation environment varies from moment to moment, as stated above, reported CQIs of various values are transmitted uniformly.

A reported CQI transmitted from the accuracy measurement apparatus shown in FIG. 2 is received by radio receiving section 210 via the antenna and antenna duplexing section 300, and undergoes predetermined radio reception processing.

The reported CQI is then decoded by CQI decoding section 220, and output to CQI statistical processing section 230. Output reported CQIs are accumulated by CQI statistical processing section 230, and after the end of the test data transmission period prior to an accuracy measurement test, reported CQI statistical processing is performed (ST1000). As the result of this statistical processing, the reported CQI reported most frequently from the communication apparatus shown in FIG. 3 is reported to scheme control section 140 as a fixed CQI.

After the fixed CQI has been decided upon in this way, a reported CQI accuracy measurement test is started.

Specifically, when the fixed CQI is reported to scheme control section 140, a transmission rate corresponding to the fixed CQI is selected based on the stored correspondence between CQI values and transmission rates (coding rates and modulation methods) (ST1100). The selected transmission rate is specified to coding section 110 and modulation section 120, and accuracy measurement data is coded and modulated by coding section 110 and modulation section 120. The accuracy measurement data is then transmitted via radio transmitting section 130, antenna duplexing section 300, and the antenna. At this time, the same channel model is used as the above-described predetermined channel model used before the start of the accuracy measurement test.

By selecting the transmission rate taking the reported CQI reported most frequently as the fixed CQI in this way, it is possible to eliminate the influence of the reception performance of the communication apparatus shown in FIG. 3 on reported CQIs. That is to say, if the communication apparatus shown in FIG. 3 is equipped with advanced receivers such as an equalizer and interference canceler, for example, the propagation environment is assumed to be better than it actually is, and a higher CQI is transmitted, but due to the fact that statistical processing is performed the fixed CQI also becomes higher, and accuracy measurement data is transmitted at a corresponding transmission rate.

Transmitted accuracy measurement data is transmitted by radio receiving section 400 via the antenna and antenna duplexing section 460 of the communication apparatus shown in FIG. 3, and, in the same way as before the start of the accuracy measurement test, a reported CQI obtained from the channel quality is reported from radio transmitting section 450 via antenna duplexing section 460 and the antenna. At the same time, if accuracy measurement data has been received correctly, an Ack indicating this fact is transmitted from the communication apparatus shown in FIG. 3 as transmit data, and if, on the other hand, accuracy measurement data has not been received correctly, a Nack indicating this fact is transmitted from the communication apparatus shown in FIG. 3 as transmit data. At this time, in the same way as before the start of the accuracy measurement test, a plurality of reported CQIs and Ack/Nack data are assumed to be transmitted during execution of the accuracy measurement test.

A reported CQI and Ack/Nack transmitted from the communication apparatus shown in FIG. 3 are received by radio receiving section 210 via the antenna and antenna duplexing section 300, and undergo predetermined radio reception processing.

The reported CQI is then decoded by CQI decoding section 220, and output to PER calculation section 260. At the same time, Ack/Nack of the accuracy measurement data corresponding to this reported CQI is decoded by Ack decoding section 240, it is determined by Ack processing section 250 whether or not this accuracy measurement data was received correctly, and the detection result is output to PER calculation section 260.

When a reported CQI and the success or failure of reception of the accuracy measurement data corresponding to that reported CQI are output to PER calculation section 260, a PER is calculated for each reported CQI value by PER calculation section 260 (ST1200). Then, of the calculated PERs, the PER corresponding to a reported CQI equal to the fixed CQI, the PER corresponding to a reported CQI one level higher than the fixed CQI, and the PER corresponding to a reported CQI one level lower than the fixed CQI, are output to determination section 270.

In determination section 270, the PER corresponding to a reported CQI equal to the fixed CQI is first compared with a predetermined threshold value A (ST1300). If the result is that the PER exceeds threshold value A, a reported CQI so high that the communication apparatus cannot achieve the desired PER has been reported most frequently—that is, the reported CQI is too high relative to the actual propagation environment—and this communication apparatus fails the reported CQI accuracy measurement test (ST1700).

If the result of the determination in ST1300 is that the PER is less than or equal to threshold value A, the PER corresponding to a reported CQI one level higher than the fixed CQI is compared with a predetermined threshold value B (ST1400). If the result is that the PER exceeds threshold value B, this indicates that accuracy measurement data has not been received correctly despite the fact that the communication apparatus determined the propagation environment to be comparatively good, and as propagation environment measurement variance is large, or the reported CQI is too high relative to the actual propagation environment, this communication apparatus fails the reported CQI accuracy measurement test (ST1700).

If the result of the determination in ST1400 is that the PER is less than or equal to threshold value B, the PER corresponding to a reported CQI one level lower than the fixed CQI is compared with a predetermined threshold value C (ST1500). If the result is that the PER is less than threshold value C, this indicates that accuracy measurement data has been received correctly despite the fact that the communication apparatus determined the propagation environment to be comparatively poor, and as propagation environment measurement variance is large, or the reported CQI is too low relative to the actual propagation environment, this communication apparatus fails the reported CQI accuracy measurement test (ST1700).

If the result of the determination in ST1500 is that the PER is greater than or equal to threshold value C, the reported CQI accuracy of the communication apparatus is appropriate, and this communication apparatus passes the reported CQI accuracy measurement test (ST1600).

Thus, according to this embodiment, test data is transmitted for a fixed period prior to a reported CQI accuracy measurement test, reported CQIs for that test data are accumulated and subject to statistical processing, and the reported CQI reported most frequently is taken as a fixed CQI. Then an accuracy measurement test is started, a PER is calculated for each reported CQI value based on reported CQIs and Ack/Nack data for accuracy measurement data transmitted with the fixed CQI, and threshold value determination is performed using the PERs corresponding to a reported CQI equal to the fixed CQI and reported CQIs one level different from the fixed CQI, enabling reported CQI accuracy to be measured accurately without regard to the reception characteristics of the communication apparatus being tested, and also making it possible to detect a communication apparatus for which reported CQIs diverge from the actual propagation environment, and a communication apparatus for which propagation environment measurement variance is large.

The determination method used by determination section 270 explained in the above-described embodiment is just one example of a determination method for detecting a communication apparatus for which reported CQIs diverge from the actual propagation environment and a communication apparatus for which propagation environment measurement variance is large, and various other determination methods are possible.

For example, in the above-described embodiment, a communication apparatus for which reported CQIs diverge from the actual propagation environment, or for which propagation environment measurement variance is large, is detected by determining whether or not the PER corresponding to a reported CQI one level lower than a fixed CQI is greater than or equal to a predetermined threshold value, but it may instead be determined whether or not the PER corresponding to a reported CQI equal to a fixed CQI, rather than a reported CQI one level lower than a fixed CQI, is greater than or equal to a predetermined threshold value.

Similarly, threshold value determination may be performed for a reported CQI differing by two levels or more from a fixed CQI.

That is to say, a communication apparatus for which there is divergence between the actual propagation environment and reported CQIs may be detected by performing threshold value determination for the PERs corresponding to a fixed CQI and a CQI differing from the fixed CQI by one level respectively.

In the above-described embodiment, the CQI reported most frequently from a communication apparatus is taken as a fixed CQI, but the present invention is not limited to this, and a configuration may be used whereby one reported CQI among reported CQIs whose frequency is greater than or equal to a predetermined threshold value is decided upon as a fixed CQI using the results of reported CQI statistical processing. A configuration may also be used whereby a reported CQI equivalent to the median value is decided upon as a fixed CQI based on the results of statistical processing.

Furthermore, in the above-described embodiment, CQI reporting by a communication apparatus has been described as an example of channel quality reporting, but the present invention is not limited to this, and the present invention can be applied as long as a communication apparatus reports information indicating the propagation environment.

The present invention is not limited to the above-described embodiment, and various variations and modifications may be possible without departing from the scope of the present invention. For example, when a communication apparatus undergoing a reported CQI accuracy measurement test receives a signal, the communication apparatus may obtain a reported CQI from the received signal and report that reported CQI to the communicating station, and also calculate an error rate corresponding to that reported CQI, establish a correspondence between the reported CQI and error rate, and store the reported CQI and error rate. Then, after the end of the accuracy measurement test, reported CQI accuracy determination may be performed on the communication apparatus side by having threshold value determination or the like performed for the stored reported CQIs and error rates.

As described above, according to the present invention the accuracy of channel quality reported from a communication apparatus can be measured correctly.

This application is based on Japanese Patent Application No. 2003-016385 filed on Jan. 24, 2003, the entire content of which is expressly incorporated by reference herein.

INDUSTRIAL APPLICABILITY

The present invention is applicable to an accuracy measurement apparatus and accuracy measurement method for channel quality report.

The invention claimed is:

1. An accuracy testing apparatus comprising:
a setting section that sets a transmission scheme for data to be transmitted to a communication apparatus;
a transmitting section that transmits the data to the communication apparatus by the set transmission scheme; and
a determination section that determines an accuracy of a channel quality report value reported from the communication apparatus, wherein:
the setting section sets one of a predetermined first transmission scheme and a second transmission scheme that is based on the channel quality report value reported from the communication apparatus in response to the data transmitted by the first transmission scheme, as the transmission scheme for the data to be transmitted to the communication apparatus;
the transmitting section transmits the data by the first transmission scheme, and, after the data has been transmitted by the first transmission scheme, transmits the data by the second transmission scheme; and
the determination section determines whether or not the channel quality report value is accurately reported from the communication apparatus, based on a reception error rate of the data transmitted by the second transmission scheme.

2. The accuracy testing apparatus according to claim 1, wherein:
based on channel quality report values reported individually from a plurality of communication apparatuses, the setting section sets the second transmission scheme per communication apparatus;
the transmitting section transmits the data to each communication apparatus by the second transmission scheme set for said each communication apparatus; and
based on reception error rates of the data transmitted to the communication apparatuses by the second transmission scheme set for said each communication apparatus, the determination section determines whether or not the channel quality report value is accurately reported from said each communication apparatus.

3. The accuracy testing apparatus according to claim 1, wherein the setting section sets the second transmission scheme according to statistics of channel quality report values.

4. The accuracy testing apparatus according to claim 1, wherein the setting section sets the second transmission scheme based on a median value of channel quality report values.

5. The accuracy testing apparatus according to claim 1, wherein the transmitting section transmits the data to the communication apparatus using a predetermined channel.

6. The accuracy testing apparatus according to claim 1, further comprising:
a calculation section that calculates the reception error rate of the transmitted data in association with values indicating channel quality, wherein:
the determination section determines whether or not the channel quality report value is accurately reported from the communication apparatus, based on a reception error rate calculated in association with a specific report value out of the values indicating channel quality.

7. The accuracy testing apparatus according to claim 1, further comprising:
a calculation section that calculates reception error rates of the transmitted data in association with a plurality of values indicating channel quality, wherein:
the determination section determines whether or not the channel quality report value is accurately reported from the communication apparatus based on reception error rates calculated in association with: (1) a median value of the plurality of values indicating channel quality and (2) a value predetermined level different from the median value.

8. A communication terminal testing apparatus comprising a pass/fail decision section that decides whether a communication apparatus which is a target of a test, passes or fails, based on a test result in the accuracy testing apparatus according to claim 1.

9. An accuracy testing method comprising:
a setting step of setting a transmission scheme for data to be transmitted to a communication apparatus;
a transmitting step of transmitting the data to the communication apparatus by the set transmission scheme; and
a determination step of determining an accuracy of a channel quality report value reported from the communication apparatus, wherein:
the setting step comprises setting one of a predetermined first transmission scheme and a second transmission scheme that is based on the channel quality report value reported from the communication apparatus in response to the data transmitted by the first transmission scheme, as the transmission scheme for the data to be transmitted to the communication apparatus;
the transmitting step comprises transmitting the data by the first transmission scheme, and, after the data has been transmitted by the first transmission scheme, transmitting the data by the second transmission scheme; and
the determination step comprises determining whether or not the channel quality report value is accurately reported from the communication apparatus, based on a reception error rate of the data transmitted by the second transmission scheme.

* * * * *